Figure 1:
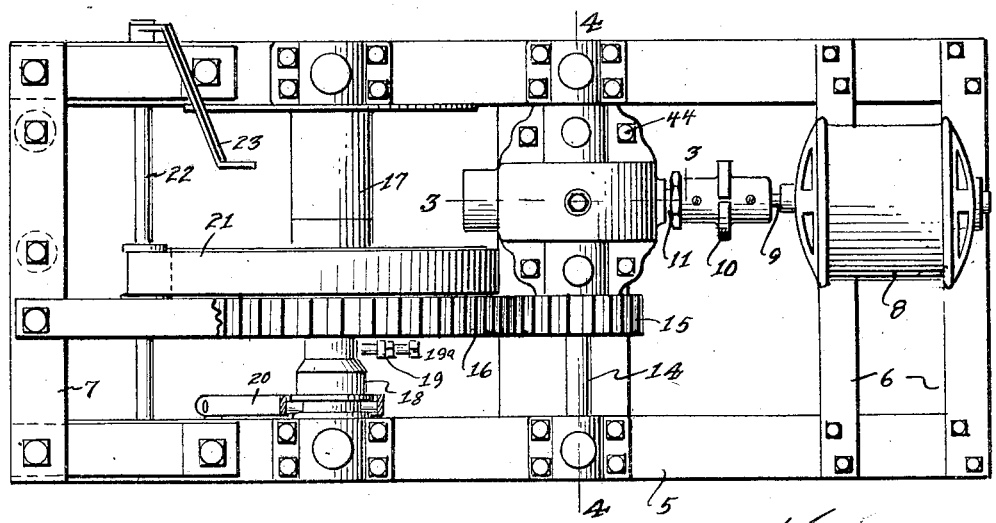

Aug. 26, 1924.

H. E. VAN ALSTYNE

WORM GEAR ASSEMBLY

Filed Aug. 29, 1921    3 Sheets-Sheet 1

INVENTOR.
Howard E. Van Alstyne
BY
Rex Frye.
ATTORNEY.

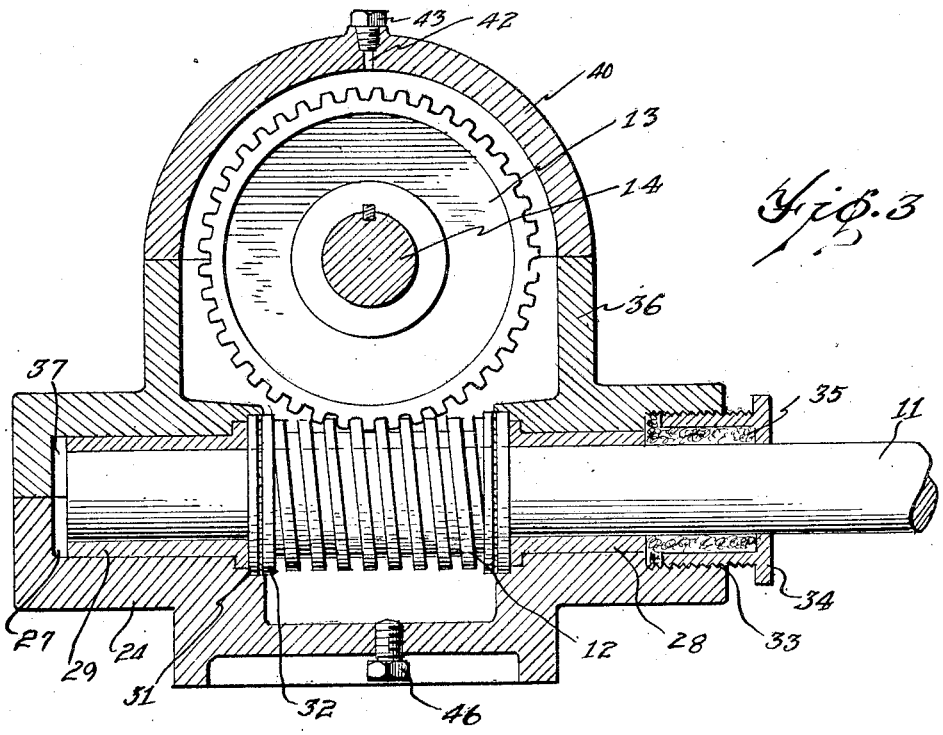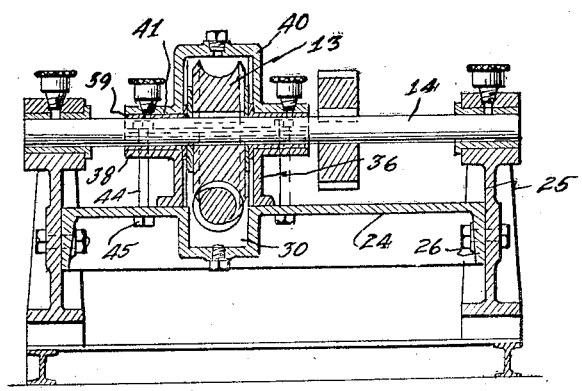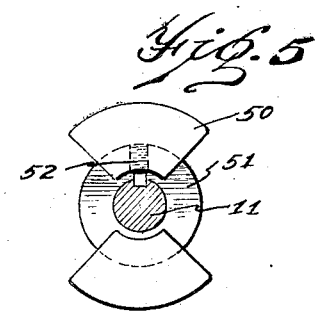

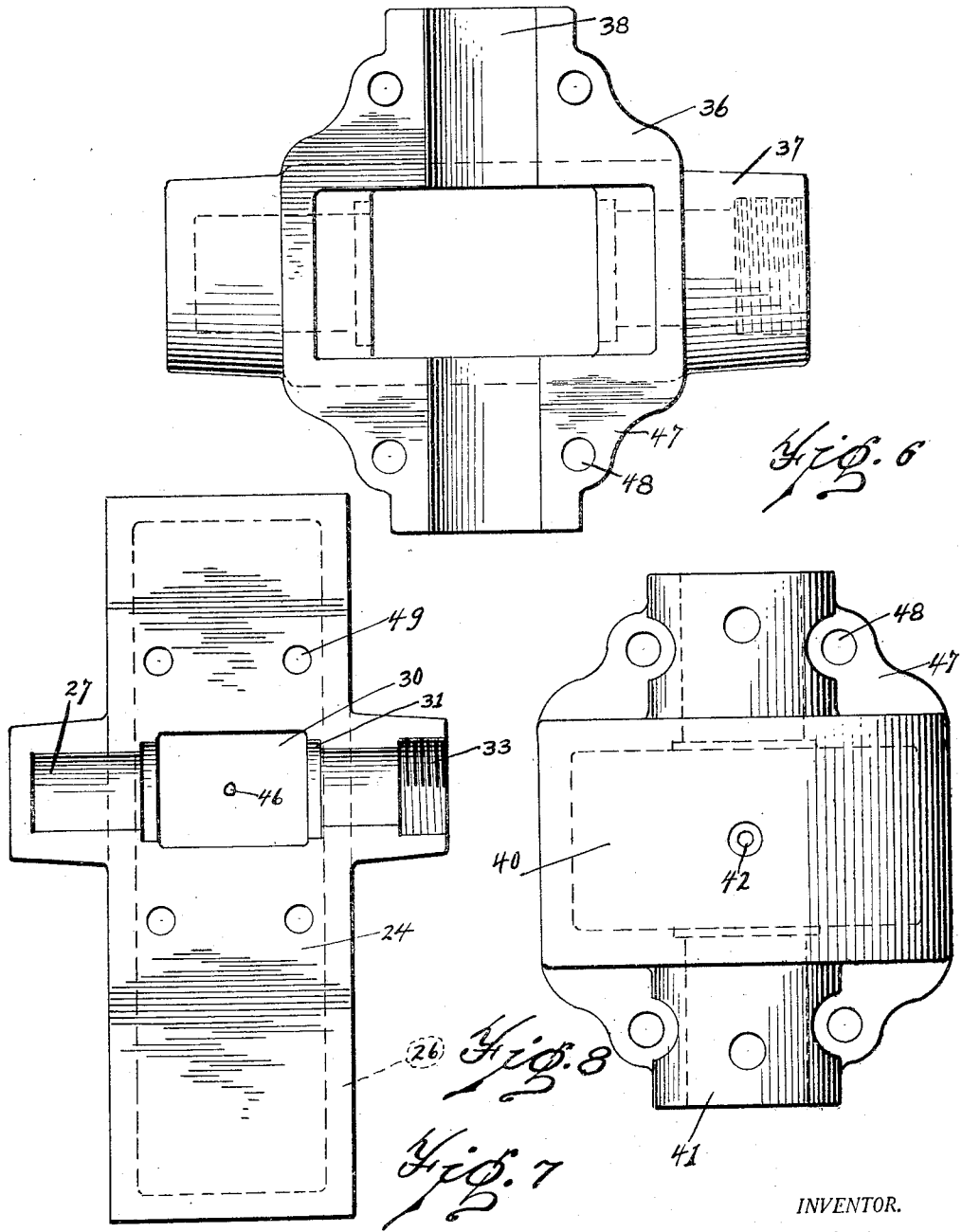

Patented Aug. 26, 1924.

1,505,983

UNITED STATES PATENT OFFICE.

HOWARD E. VAN ALSTYNE, OF DETROIT, MICHIGAN, ASSIGNOR TO MILLER-SELDON ELECTRIC COMPANY, OF DETROIT, MICHIGAN.

WORM-GEAR ASSEMBLY.

Application filed August 29, 1921. Serial No. 496,358.

*To all whom it may concern:*

Be it known that I, HOWARD E. VAN ALSTYNE, a citizen of the United States, and residing at Detroit, county of Wayne, and State of Michigan, have invented a new and Improved Worm-Gear Assembly, of which the following is a specification.

This invention relates to an improved construction of gear wheel assembly and more particularly to an improved mounting for worm-gear drive or transmission mechanism.

The principal objects of my invention include the provision of a simple and compact sectional casing for intermeshing worm and spur gears that may be readily produced with a minimum of machining operations and those on parts that are readily accessible; the arrangement of divided journals for the reception of the gear shafts bearings, and the fastening of all casing sections together by the same bolts to permit quick assembly and dismantling for inspection or replacement of parts.

Other objects and advantages will be apparent from the following description in which reference is had to the accompanying drawings illustrating a preferred embodiment of my invention and in which similar reference numerals designate similar parts throughout the several views.

In the drawings:—

Figure 2:
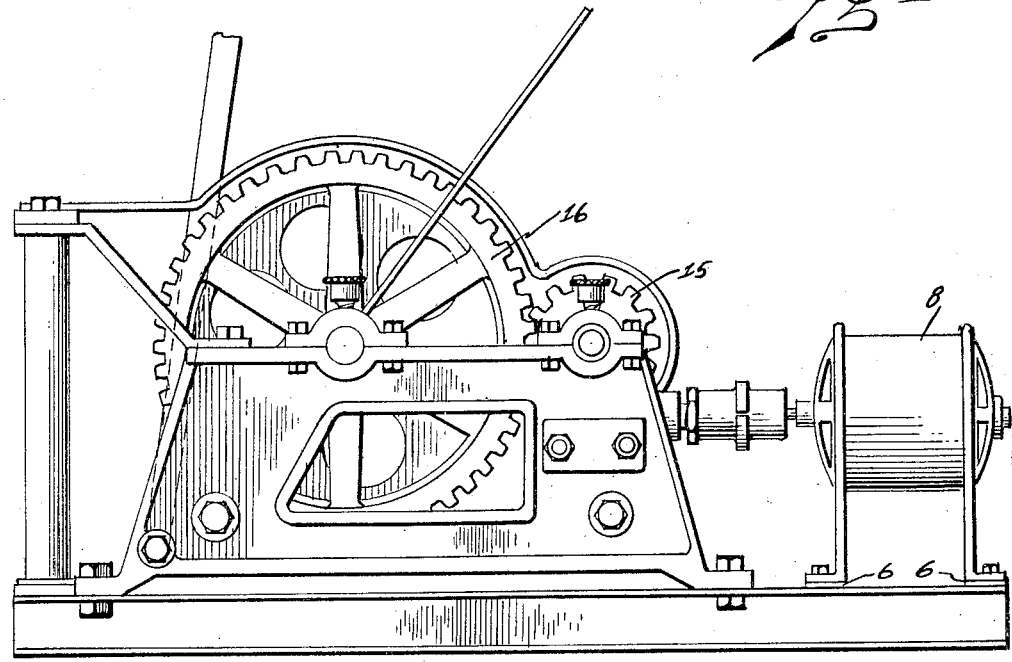

Fig. 1 is a plan view of a hoisting apparatus operated through the worm-gear assembly, forming the subject matter of this invention; Fig. 2 is a side elevation thereof; Fig. 3 is an enlarged sectional view taken substantially on the line 3—3 of Fig. 1; Fig. 4 is a sectional view on the line 4—4 of Fig. 1; Fig. 5 is a detail elevation of one section of a flexible coupling by which the gear wheel assembly is connected with a prime mover or intermediate gearing; Fig. 6 is a detail plan view of the central casing section; Fig. 7 is a similar view of the lower casing section, and Fig. 8 is a similar view of the upper casing section.

I have illustrated a complete hoisting apparatus to show one adaptation of my improved worm-gear assembly, and this hoisting apparatus is not claimed herein but forms the subject matter of my companion application Serial No. 496,357 filed Aug. 29, 1921. It will be understood that my improved worm-gear assembly is adapted for use in many other apparatus and mechanisms and the hoisting apparatus herein disclosed is merely for the purpose of illustration.

In the drawings the numeral 5 designates the longitudinal rails of a supporting bed for the hoisting apparatus, the longitudinal rails being connected by crossbars 6 and 7 to prevent spreading. Upon the crossbars 6 is suitably mounted an electric motor 8 adapted to be connected with a source of current for rotating the various moving elements of the hoisting apparatus. The shaft 9 of the motor is suitably connected, as by a flexible coupling 10, with the shaft 11 of the worm-gear 12 of my improved worm-gear assembly, hereinafter more fully described. The worm-gear 12 meshes with a spur gear 13 keyed on the shaft 14 which, in the illustrated embodiment, also carries the pinion 15, meshing with the main gear 16 of the hoisting apparatus. The hoisting drum 17 is arranged in alignment with the drive gear 16 and may be suitably clutched therewith whenever desired, by sliding the clutch operating member 18 to rock the clutch lever 19. The clutch (not shown) is thereby thrown into engagement with the hoisting drum to rotate the same as long as the clutch remains in contact. A hand lever 20 is provided for sliding the clutch operating member 18 into and out of engagement with the adjustable bolt 19ª of the clutch lever 19. A brake 21 operated by rocking the brake shaft 22 through the hand lever 23 is provided for quickly stopping the rotation of the hoisting drum after the clutch has been disconnected. Since the hoisting apparatus forms no essential part of the present invention it is not believed necessary to describe the same in further detail.

The casing of my improved worm-gear assembly is herein shown as comprising a lower section 24 of sufficient width to extend between the sides 25 of the framework of the hoisting apparatus and provided with down turned flanges 26 whereby it may be firmly bolted to such framework (see Fig. 4). The upper surface of the lower section 24 is adapted to extend into alignment with the axis of the worm-gear shaft 11 (see Fig. 3), and is provided with cup shaped seats 27 adapted to form the lower half of the journals for the reception of the bearings 28 and 29 in which the shaft 11 rotates. Immediately below the worm-gear 12 the lower section 24 is provided with a deep well 30 to contain oil or other lubricant, and if desired a portion of this section 24 may be cut away, as at 31, to receive thrust bearings 32, and threaded, as at 33, to receive the rotatable member 34 of the stuffing-box 35 (see Fig. 3).

The central casing section 36 is arranged with its lower face in alignment with the axis of the worm shaft 11 and is formed with supplemental journal seats 37 for completing the enclosure of the bearings 28 and 29 of the worm-gear shaft 11, and with supplemental cutout portions for the reception of the thrust bearings 32 and the rotatable member 34 of the stuffing-box 35. In other words, when the central section 36 is fitted upon the lower casing section 24 the two form divided journals for the bearings of the worm-gear shaft 11 and the stuffing-box 35. The upper surface of the central section 36 terminates substantially in alignment with the axis of the spur-gear shaft 14 (see Figs. 3 and 4) and is formed with semicircular seats 38 for the reception of the bearings 39 in which the shaft 14 is adapted to rotate. These journal seats 38 are, of course, angularly disposed with relation to the journal seats 37, forming the upper supplement of the bearings for the worm-gear shaft 11.

The upper casing section 40 is arranged with its lower surface substantially in alignment with the axis of the spur-gear shaft 14, and is provided with semi-circular journal seats 41 arranged to form supplements of the journal seats 38 of the central casing section to house the bearings 39 of the shaft 14. The central portion of the upper casing section is shaped to enclose the upper half of the spur-gear 13 and is preferably provided with an inlet opening 42 for oil or other lubricant. This inlet opening may be suitably closed by a cap 43.

Each of the casing sections 36 and 40 are provided with apertured webs 47, the apertures 48 of which are arranged to align with similar apertures 49 in the lower casing section 24 when the casing is assembled. Through such aligned apertures are extended a plurality of fastening bolts 44 so that when the nuts 45 thereof are turned up the several casing sections will be firmly held in position. The contacting surfaces of the several casing sections may be suitably shaped to insure correct alignment of the various sections and also to aid in retaining lubricant with which the casing is adapted to be filled to any desired extent. This lubricant may be introduced through the inlet aperture 42 of the upper section or inserted before the upper section is placed in position. A drain plug 46 may be provided in the lower section 24 for the removal of the lubricant when desired.

For convenient attachment of my worm-gear assembly with a prime mover or intermediate gearing I preferably secure one section of a flexible coupling, as 10, onto the worm-gear shaft 11. As herein illustrated the flexible coupling 10 consists of interfitting quadrants 50, some of which are secured on the worm shaft 11 and the remainder of which are secured on the shaft 9 of the prime mover 8. These quadrants 50 are preferably formed on a sleeve 51 keyed to the ends of the shafts 9 and 11 respectively, and be suitably secured thereto, as by the pins 52. A slight play is allowed between the quadrants so as to permit rotation when the shafts 9 and 11 are not in complete alignment.

The dismantling of my improved worm-gear assembly for removal of parts or repair is accomplished by simply removing the bolts 44 which secure the casing sections together. The upper casing section can then be lifted off and the spur-gear shaft and connected parts removed after the bearing retaining brackets on the frame 25 are removed. The central casing section can next be lifted, freeing the worm-gear and shaft so that it can be readily lifted with its bushings and thrust bearings attached. It is apparent that repairs or replacements of any of these parts can be quickly made.

While it will be apparent that the illustrated embodiment of my invention herein disclosed are well calculated to adequately fulfill the objects and advantages primarily stated, it is to be understood that the invention is susceptible to variations, modification and change within the spirit and scope of the subjoined claims.

Having described my invention I claim:—

1. A gear wheel assembly including a worm gear and shaft, a spur gear and shaft angularly disposed with reference to the worm gear shaft, a tri-partite sectional casing enclosing said gears and having co-operating semi-cylindrical portions forming journal seats for said shafts, and a single set of fastening bolts arranged to secure the casing sections and the gear shafts in position.

2. A gear casing having three sections, each of which is provided with apertures adapted to align with those of the others, and common means extending through such apertures for securing the sections together.

3. A gear casing having three sections, one end section being provided with partial journal seats, the other end section being provided with partial journal seats angularly disposed with reference to the first mentioned journal seats, the central section being provided with partial journal seats adapted to supplement the partial journal seats of both end sections, and a single set of fastening bolts arranged to pass through and secure all the sections together.

Signed this 25 day of July, 1921.

HOWARD E. VAN ALSTYNE.

Witnesses:
 ARCHE MILLER,
 OLIVER PHELPS, Jr.